US009338697B1

(12) United States Patent
Breau et al.

(10) Patent No.: US 9,338,697 B1
(45) Date of Patent: *May 10, 2016

(54) MOBILE DEVICE HANDOFF WHILE MAINTAINING CONNECTIVITY WITH MULTIPLE ACCESS POINTS

(71) Applicant: SPRINT COMMUNICATIONS COMPANY L.P., Overland Park, KS (US)

(72) Inventors: Jeremy R. Breau, Leawood, KS (US); Sohel Khan, Philadelphia, PA (US)

(73) Assignee: Sprint Communications Company L.P., Overland Park, KS (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/764,402

(22) Filed: Feb. 11, 2013

Related U.S. Application Data

(63) Continuation of application No. 13/367,597, filed on Feb. 7, 2012, now Pat. No. 8,391,264, which is a continuation of application No. 13/109,119, filed on May 17, 2011, now Pat. No. 8,144,678, which is a continuation of application No. 11/625,609, filed on Jan. 22, 2007, now Pat. No. 7,969,953.

(51) Int. Cl.
*H04W 36/34* (2009.01)
*H04W 36/00* (2009.01)

(52) U.S. Cl.
CPC .................................. *H04W 36/00* (2013.01)

(58) Field of Classification Search
None
See application file for complete search history.

(56) References Cited

U.S. PATENT DOCUMENTS

| 7,058,059 | B1 * | 6/2006 | Henry et al. ................ 370/395.1 |
| 2005/0025163 | A1 * | 2/2005 | Christie .......................... 370/401 |
| 2005/0163078 | A1 * | 7/2005 | Oba et al. ........................ 370/331 |
| 2005/0169220 | A1 * | 8/2005 | Sreemanthula et al. ....... 370/338 |
| 2006/0215623 | A1 * | 9/2006 | Lin et al. ........................ 370/338 |
| 2007/0189218 | A1 * | 8/2007 | Oba et al. ........................ 370/331 |
| 2007/0217363 | A1 * | 9/2007 | Ue et al. ......................... 370/331 |
| 2007/0248064 | A1 * | 10/2007 | Shaheen ......................... 370/338 |

* cited by examiner

*Primary Examiner* — Hassan Phillips
*Assistant Examiner* — Duc Duong

(57) ABSTRACT

A method, system, and computer-readable media are provided for allowing a mobile device to maintain communication connectivity during a handoff between wireless access points. In one aspect, the method may include negotiating security association information and establishing a first communication tunnel by tunneling an inner IP address within a first outer IP address. The method may further include authenticating a request for establishing a second communication tunnel by identifying the negotiated security association information within the request. Additionally, the method may include establishing the second communication tunnel by tunneling the inner IP address within a second outer IP address. Moreover, the method may include pushing data associated with the communication session through the second communication tunnel.

17 Claims, 5 Drawing Sheets

MOBILE DEVICE HANDOFF WHILE MAINTAINING CONNECTIVITY WITH MULTIPLE ACCESS POINTS

CROSS-REFERENCE TO RELATED APPLICATIONS

This application is a continuation of application Ser. No. 13/367,597, filed Feb. 7, 2012, which is a continuation of application Ser. No. 13/109,119, filed May 17, 2011 and issued Mar. 27, 2012 as U.S. Pat. No. 8,144,678, which is a continuation of application Ser. No. 11/625,609, filed Jan. 22, 2007 and issued Jun. 28, 2011 as U.S. Pat. No. 7,969,953, all of which are entirely incorporated herein by reference.

INTRODUCTION

Today, mobile devices such as cellular phones, for example, are designed to allow users to communicate with each other wirelessly at remote locations. Such mobile devices are able to facilitate mobile communication by maintaining connectivity with a neighboring Wireless Access Point (WAP). A WAP is a device that connects mobile devices together to form a wireless network. The WAP usually connects to a wired network, and can relay data between wireless devices and wired devices.

In establishing a communication session, a mobile device generally associates and connects itself to a first WAP nearby. As the mobile device moves away from the coverage of the first WAP, it may determine that its signal strength with the first WAP has reached or exceeded a certain threshold level that will require the mobile device to connect with a second supporting WAP. Once the mobile device has located a sufficient second supporting WAP, the mobile device will have to drop its association with the first WAP before attempting to connect to the second WAP. After dropping the session with the first WAP, there is a period of time where the mobile device must associate and connect itself with the second WAP by negotiating a new Internet Protocol (IP) address with the second WAP. During this period of time, there is no connectivity between the mobile device and a WAP. This may be problematic as the mobile device may not receive all data being communicated by other devices within a communication session.

Accordingly, there exists a need to provide a way for mobile devices to maintain connectivity with a WAP while going through a handoff to another WAP. Such a method should allow a mobile device to simultaneously multiplex communication between two or more WAPs. Furthermore, the method should allow a mobile device to maintain connectivity with more than one WAP at a time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The presenting invention is defined by the claims below. Embodiments of the present invention solve at least the above problems by providing a system and method for, among other things, allowing a mobile device to maintain communication connectivity during a handoff between wireless access points.

In a first aspect, one or more non-transitory computer-readable media having computer-useable instructions embodied thereon provide a method of allowing a mobile device to maintain communication connectivity during a handoff between wireless access points. The method may include negotiating security association information with a routing device. Additionally, the method may include creating a first encrypted communication tunnel to the routing device from a first software module using a first IP address. Furthermore, the method may include establishing a communication session with one or more devices through the first encrypted tunnel. Moreover, the method can include creating a second encrypted communication tunnel to the routing device from a second software module using a second IP address and the negotiated security association information. The method may also include disabling the first encrypted communication tunnel after a data packet from the communication session is received through the second encrypted communication tunnel.

In another aspect, one or more non-transitory computer-readable media having computer-useable instructions embodied thereon provide another method of allowing a mobile device to maintain communication connectivity during a handoff between wireless access points. The method may include negotiating security association information and establishing a first communication tunnel by tunneling an inner IP address within a first outer IP address. The method may further include authenticating a request for establishing a second communication tunnel by identifying the negotiated security association information within the request. Additionally, the method may include establishing the second communication tunnel by tunneling the inner IP address within a second outer IP address. Moreover, the method may include pushing data associated with the communication session through the second communication tunnel.

In yet another aspect, a system is provided for allowing a mobile device to maintain communication connectivity during a handoff between wireless access points. The system may include one or more mobile devices for establishing encrypted communication tunnels with other devices, negotiating security association information with other devices, and for multiplexing network interface card usage between a plurality of software modules within the network interface card. The system may also include a plurality of wireless access points for receiving requests assigning IP addresses to the one or more mobile devices in response to a received request. Furthermore, the system may include a routing device for establishing the encrypted communication tunnels with the one or more mobile devices by tunneling an inner IP address within the assigned IP addresses, and for authenticating requests for encrypted communication tunnels by identifying negotiated security association information.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide, among other things, systems and methods for allowing a mobile device to maintain communication connectivity during a handoff between wireless access points. An embodiment of the invention allows a mobile device with a single network inteface card to simultaneously register with multiple wireless networks. The mobile device can associate to both a source network (WAP) and a target network. The mobile device obtains an IP address on the target network via a Dynamic Host Configuration Protocol (DHCP) request, updates the Mobile Internet Key Exchange (MOBIKE) enabled IPSec endpoint with the target IP address, waits to receive the first data packet for the session on the new wireless network, and then drops the association with the source network (WAP).

Further, various technical terms are used throughout this description. A definition of such terms can be found in *Newton's Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more non-transitory computer-readable media.

Non-transitory computer-readable media include both volatile and nonvolatile media, removable and nonremovable media, and contemplates media readable by a database, a switch, and various other network devices. By way of example, and not limitation, non-transitory computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
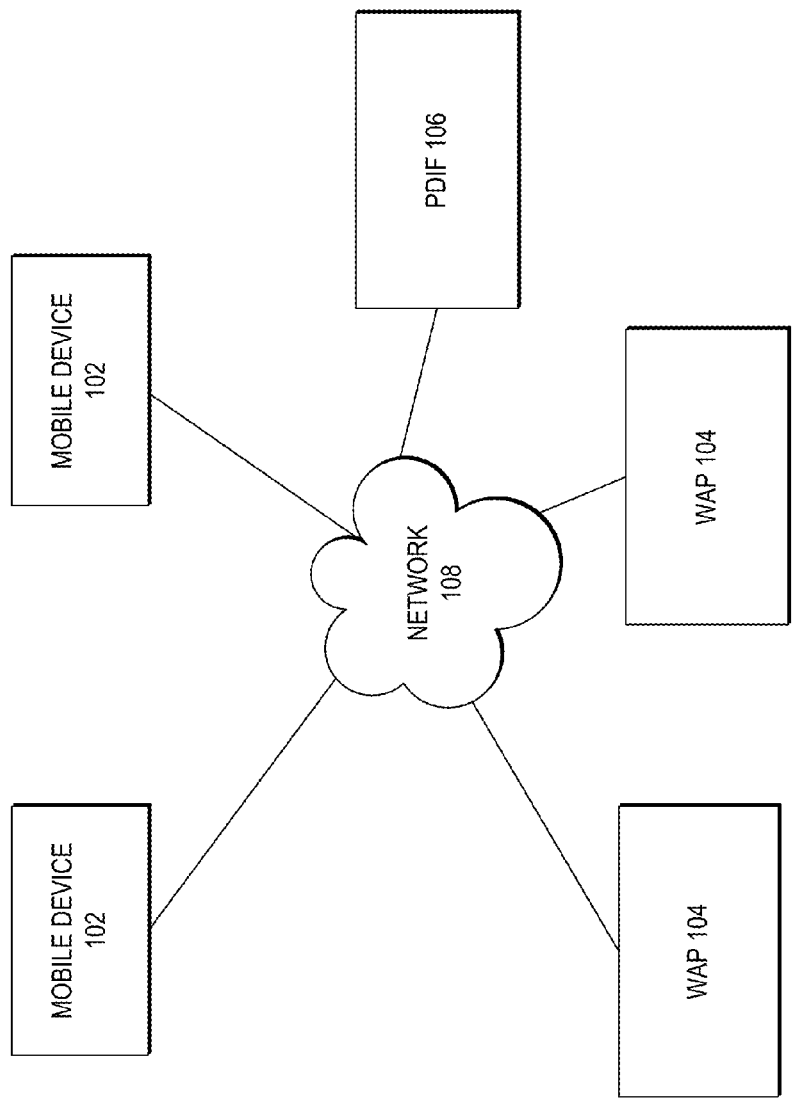
FIG. 1 is an embodiment of a system for implementing the present invention.

FIG. 1 is an embodiment of a system 100 for implementing the present invention. The system 100 can include a plurality of mobile devices 102, a plurality of WAPs 104, a routing device 106, and network 108. Mobile device 102 may be or can include a laptop computer, a network-enabled cellular telephone (with or without media capturing/playback capabilities), a wireless email client, or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information to other devices over wireless network 108. Wireless network 108 may comprise any wireless access technology including, but not limited to, IEEE 802.11, IEEE 802.15, and 802.16. In the preferred embodiment, wireless network 108 comprises the IEEE 802.11 wireless access technology. The WAP 104 contains equipment for transmitting and receiving signals from a mobile device 102. The WAP 104 may also have other equipment for encrypting and decrypting communication with the mobile device 102.

The invention can be configured to use the Mobile Internet Key Exchange (MOBIKE) protocol. MOBIKE allows IP security (IPSec) tunnel connected mobile devices to change the outer tunnel address without the requirement of reestablishing the security association. MOBIKE helps allow a mobile device to maintain communication connectivity by using another IP address for communication that is tunneled inside the outer IP address. For example, when a mobile device 102 initiates a communication session by first obtaining a first IP address for connecting to a first WAP and then negotiates a second IP address for connecting to a second WAP, the mobile device 102 can maintain connectivity to its communication session by using a third IP address for communication that is not associated with either the first or second WAP. The third IP address is tunneled inside an IP address that the mobile device receives from a WAP.

The mobile device 102 receives the third IP address from a routing device such as Packet Data Inter-working Function (PDIF) device 106. The mobile device 102 can obtain the third IP address after it connects to the first WAP when initiating a communication session. For example, a mobile device 102 can use the IP address that it receives from a WAP to create a tunnel to the PDIF 106. The PDIF 106 can then assign an inner IP address to the mobile device 102 that the mobile device can use for communication. The inner IP address is tunneled inside of the outer IP address. Accordingly, the outer IP address given by the WAP is only used to tunnel back to the PDIF 106. During a communication session between the mobile device 102 and the other connected devices, when the mobile device transmits data, the PDIF 106 terminates the tunnel, decrypts the inner IP address and payload information, and sends the decrypted data across the network 108 to the other connected devices in the session. In an embodiment, the PDIF is a router.

Figure 2:
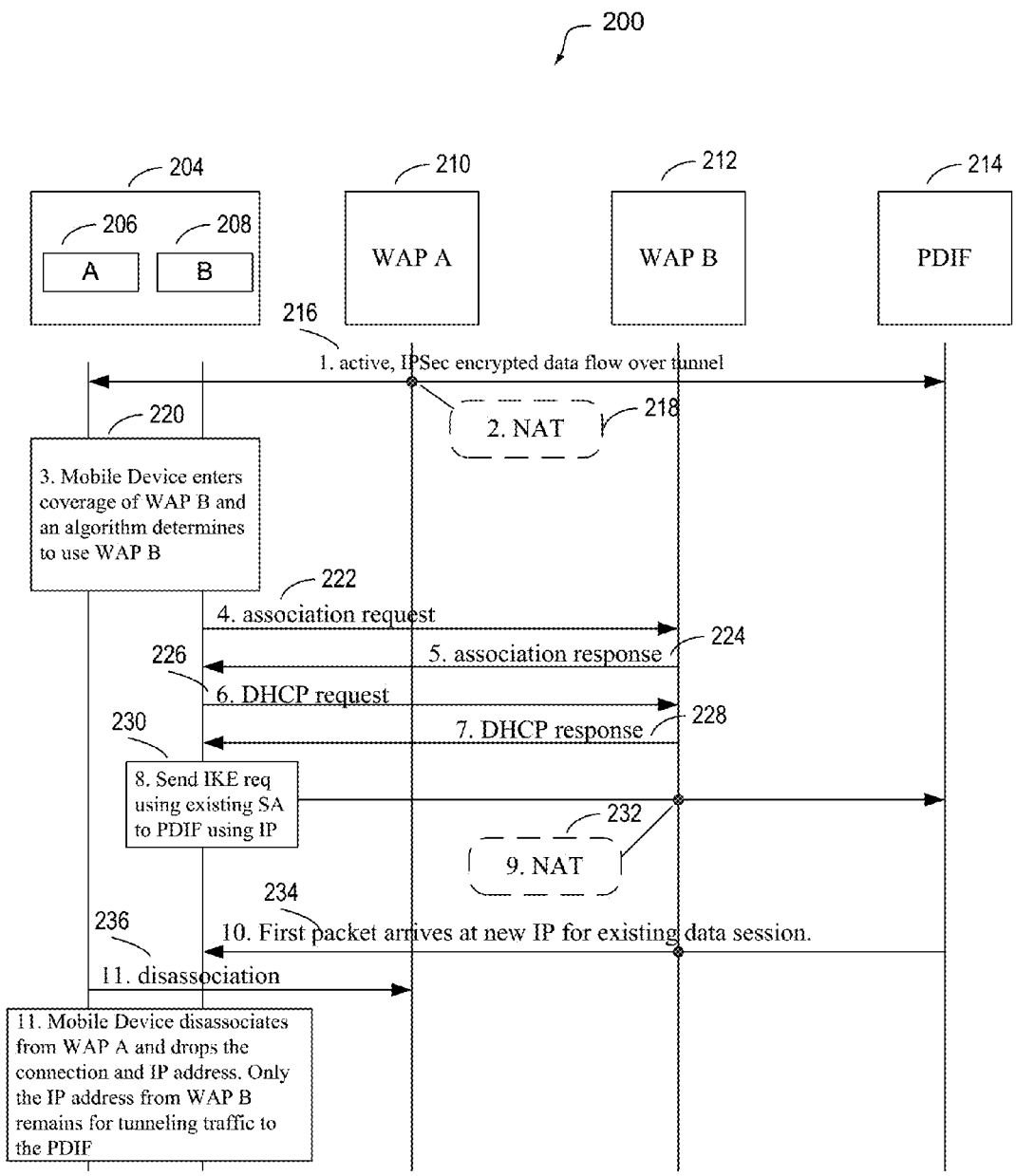
FIG. 2 is a block diagram of an exemplary system and method for maintaining communication connectivity when switching between access points.

FIG. 2 is a block diagram of an exemplary system and method 200 for maintaining communication connectivity when switching between wireless access points. When the mobile device initially establishes a communication session, it will need to associate and connect itself with a neighboring WAP such as WAP-A 210. When the mobile device decides that it will connect to WAP-A 210, it will create a software module-A 206 as a logical wireless interface within its Network Interface Card (NIC) 204. Software module-A 206 can be used to frame and forward data packets to WAP-A 210. The mobile device can then request an IP address from WAP-A 210. Once the mobile device receives the IP address, at operation 216 the mobile device uses the MOBIKE protocol and the IP address to create an encrypted tunnel to connect to the PDIF 214. The mobile device and the PDIF 214 may proceed to establish IPSec Security Association (SA) information to facilitate their communication. The IPSec SA can include a set of keys negotiated between the mobile device and the PDIF 214. The mobile device 202 and the PDIF can both store the set of keys internally once the keys are negotiated.

The PDIF 214 can then assign an inner IP address to the mobile device within the outer IP address assigned by the WAP-A 210 to thereby create an IPSec encrypted data flow tunnel. By creating the encrypted tunnel, the inner data packet IP header and payload information can be encrypted. The encrypted information can be routed across the network infrastructure by putting another IP header on the outside of encrypted information.

At operation 218, the IP address given by the WAP-A 210 may go through Network Address Translation (NAT) wherein it is translated from a private address to a public address of the network. The IP address is translated as data packets go between the mobile device and the PDIF 214.

At operation 220, the mobile device enters the coverage of WAP-B 212 and an algorithm employed by NIC 204 determines to use WAP-B 212. In an embodiment, the algorithm may determine that the decibel loss on the WAP-A 210 network signal is too great to sustain wireless data communication, and may then determine that the signal strength from the WAP-B 212 is strong enough to facilitate data communication. Based on these determinations it may make the decision to switch its connectivity from WAP-A 210 to WAP-B 212.

Once the mobile device makes the decision to switch to WAP-B 212, the mobile device instantiates a software module-B 208 as a logical wireless interface within its NIC 204. The software module-B 208 can be used to frame and forward data packets to WAP-B 212. At operation 222, the software module-B 208 sends an association request to the WAP-B 212. The association request can include, but is not limited to, a Service Set Identifier (SSID), a Media Access Control (MAC) address, and the mobile device's supported data rate. At operation 224, the WAP-B 212 sends an association response back to the software module-B 208 of the mobile device. The association response informs the module whether or not the WAP-B 212 accepts the association request. Once the WAP-B 212 accepts the mobile device's association request, a connectivity link between the software module-B 208 and the WAP-B 212 is established.

At operation 226, the software module-B 208 sends a Dynamic Host Configuration Protocol (DHCP) request to the WAP-B 212 for an IP address. The WAP-B 212 can then select an IP address from a pool of IP addresses stored in a local internal DHCP server. At operation 228, the WAP-B 212 sends a DHCP response that includes the selected IP address. At this point the mobile device will have two software connections with two different WAPs. The mobile device can multiplex when each software module can utilize the NIC 204 such that each software module is scheduled on time increments to use the NIC 204. For example, one hundred milliseconds worth of data communication can be used for software module-A 206, then the next one hundred milliseconds of data communication can be used by software module-B 208, then the next one hundred milliseconds can be used by software module-A again, and the multiplexing between each software module can continue until the mobile device disassociates itself with WAP-A 210. As the mobile device multiplexes the data communication, the mobile device receives and buffers data packets from both WAPs (WAP-A and WAP-B) and forwards the data packets to the respective software modules when appropriate. Accordingly, by multiplexing the communication, the mobile device can communicate with multiple WAPs with a single NIC 204.

At operation 230, software module-B 208 sends an Internet Key Exchange (IKE) request to the PDIF 214 in order to establish an IPSec cryptic tunnel in the same manner as operation 216. The new cryptic tunnel is established using the IP address received from WAP-B 212 and by using the same set of keys negotiated between the mobile device and the PDIF during the initial IPsec set-up. At operation 232, the IP address received from the WAP-B 212 may go through a NAT process.

At operation 234, by identifying the keys received in operation 230, the PDIF recognizes that the mobile device that is attempting to make a connection is the same mobile device from the connection established in operation 216. By determining that the mobile device has the same IPSec SA information for the existing IPSec, the PDIF can allow the connection to be switched from the software module-A tunnel to the software module-B tunnel so that data communication continues over the software module-B tunnel. At operation 236, there's a disassociation between the software module-A 206 and the WAP-A 210. During the disassociation, multiplexing discontinues and only software module-B 208 uses the NIC 204. Additionally, the mobile device disables the software module-A 206, drops the connection and IP address associated with WAP-A 210, and removes any information that was associated with the instantiation of the software module-A 206. The only IP addresses that remain with the mobile device are the IP address for WAP-B 212 and the inner IP address initially received from the PDIF used for data communication.

Figure 3:
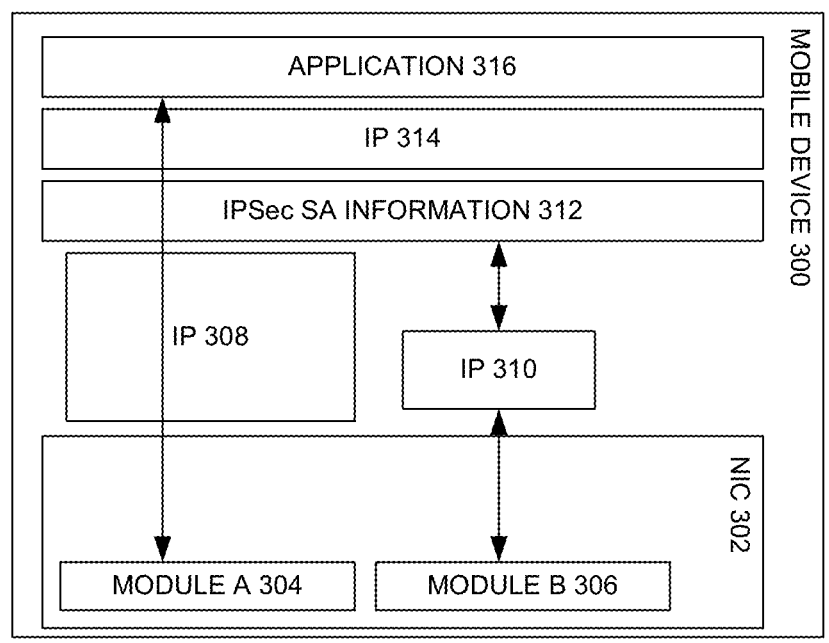
FIG. 3 is a block diagram of a detailed representation of an exemplary mobile device.

FIG. 3 is a block diagram of a detailed representation of an exemplary mobile device 300. As previously discussed, mobile device 300 includes NIC 302 and software module-A 304, and software module-B 306. It should be noted that mobile device 300 can include more than two software modules. The number of software modules existing within NIC 302 at one time generally depends on the number of WAPs that the mobile device 300 is able to connect to. IP address 308 is the IP address assigned by WAP-A 210, and IP address 310 is the IP address assigned by WAP-B 212. The current IPSec SA information 312 includes the keys negotiated by the mobile device and the PDIF. IP address 314 is the IP address assigned by the PDIF at operation 216 and is constant throughout the mobile device's communication session. The application 316 is used to communicate to target devices such as web hosts or email severs for example.

As illustrated in FIG. 3, both the tunnels that are created from each of the software modules would use the same IPSec SA information. Using that same IPSec SA information is one way in which MOBIKE is supported. Essentially, the mobile device 300 can initiate a tunnel from any IP address as long as it has the correct IPSec SA information. With this information, the mobile device can move the tunnel between outer IP addresses without having to reestablish the IKE.

Figure 4:
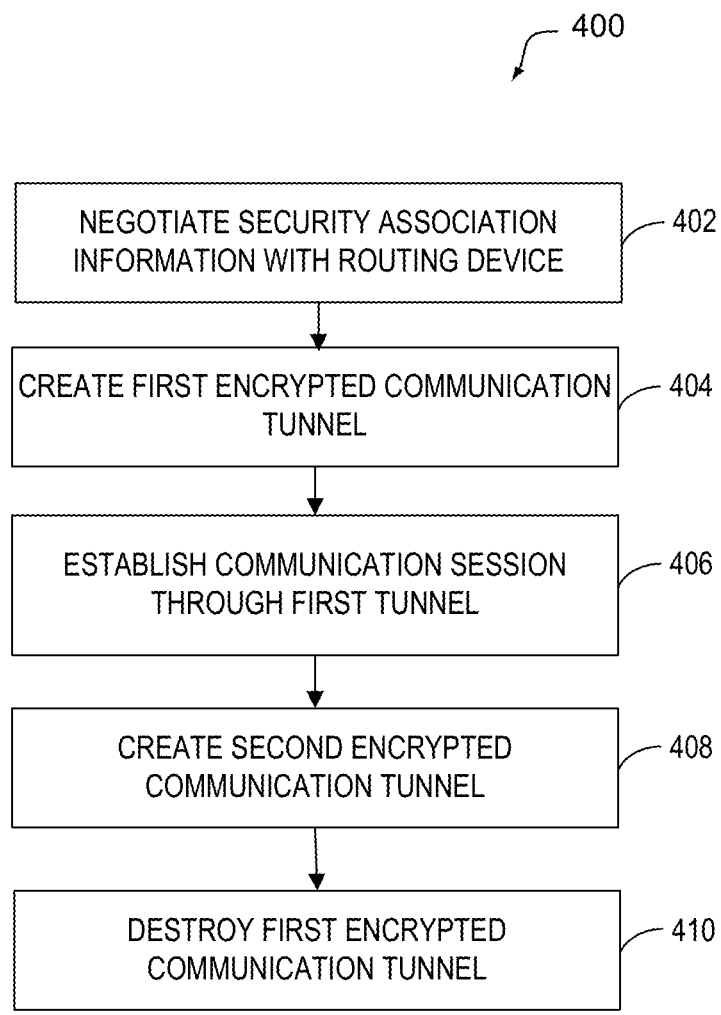
FIG. 4 is a flow diagram of method for allowing a mobile device to maintain communication connectivity during a handoff between wireless access points.

FIG. 4 is a flow diagram of method 400 for allowing a mobile device to maintain communication connectivity during a handoff between WAPs. At operation 402, security association information is negotiated with a routing device. The security association information may be, for example, a set of encryption keys. At operation 404, a first encrypted communication tunnel is established from a first software module to the routing device. The first encrypted communication tunnel can be established using an IP address assigned by a first WAP. The first software module may be located within a NIC of the mobile device. At operation 406, a communication session is established through the first encrypted communication tunnel. The communication session may be, for example, a voice, data, or video communication session.

At operation 408, a second encrypted communication tunnel is established from a second software module to the routing device. The second encrypted tunnel may be established using an IP address assigned by a second WAP. The second software module may be located within a NIC of the mobile device. At operation 410, the first encrypted communication tunnel is disabled after a data packet of the communication session is received through the second encrypted communication tunnel.

Figure 5:
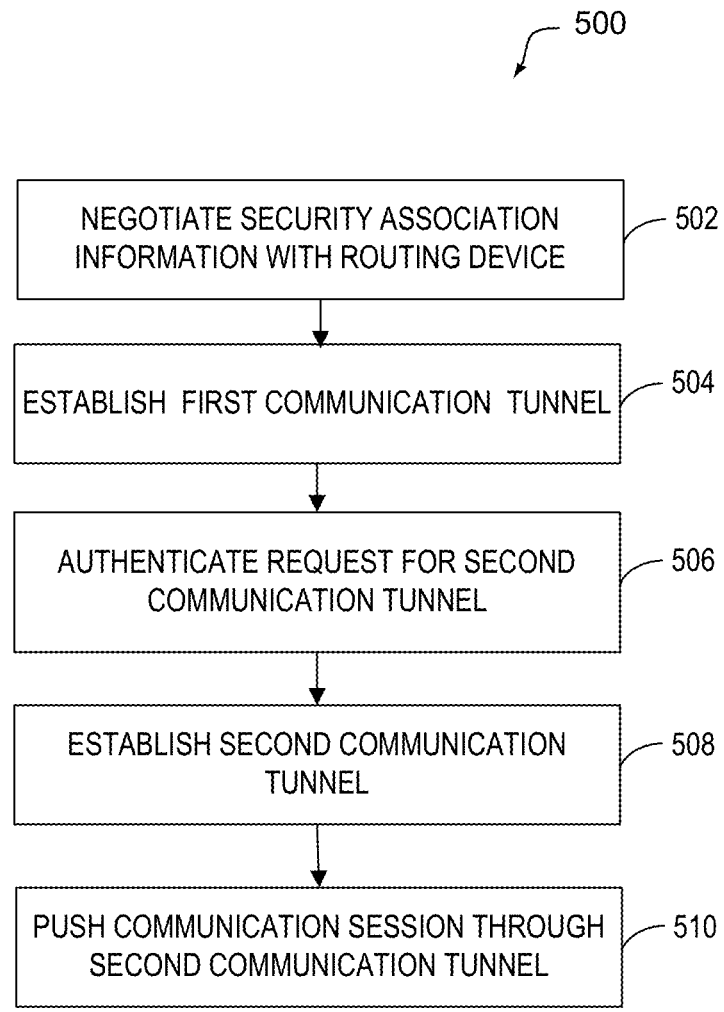
FIG. 5 is yet another flow diagram of method for allowing a mobile device to maintain communication connectivity during a handoff between wireless access points.

FIG. 5 is yet another flow diagram of method 500 for allowing a mobile device to maintain communication connectivity during a handoff between WAPs. At operation 502, security association information is negotiated. The security association information may be negotiated, for example, between a mobile device and a routing device. The security association information may be, for example, a set of encryption keys. At operation 504, a first communication tunnel is established by tunneling an inner IP address within a first outer IP address. The first outer IP address may be assigned by a first WAP. Once the first communication tunnel is created, a communication session may be established through the first communication tunnel. The communication session may be, for example, a voice, data, or video communication session. At operation 506, a request for establishing a second communication tunnel is authenticated by identifying the negotiated security association information within the request. At operation 508, the second communication tunnel is established by tunneling the inner IP address within a second outer IP address. The second outer IP address may be assigned by a second WAP. At operation 510, data associated with the communication session is pushed through the second communication tunnel.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A mobile device, comprising:
a network interface card comprising a first software module and a second software module;
wherein the mobile device receives a first outer internet protocol (IP) address assigned by a first wireless access point (WAP), a second outer IP address assigned by a second WAP, and an inner IP address assigned by a routing device that is tunneled to the routing device via the first outer IP address and second outer IP address; and
a multiplexor to multiplex utilization of the network interface card between the first software module and the second software module during a handoff of the mobile device from the first WAP to the second WAP, wherein connectivity is maintained by simultaneously multiplexing data communication between a first software module associated with the first outer IP address and a second software module associated with the second IP address until the handoff of the mobile device from the first WAP to the second WAP is completed.

2. The mobile device of claim 1, further comprising: IP security keys negotiated by the mobile device and the routing device.

3. The mobile device of claim 2, wherein the first outer IP address forms a first encrypted communication tunnel.

4. The mobile device of claim 3, wherein the second outer IP address forms a second encrypted communication tunnel.

5. The mobile device of claim 4, wherein the first encrypted communication tunnel is disabled after a data packet of the communication session is received through the second encrypted communication tunnel.

6. The mobile device of claim 2, wherein the mobile device maintains two connections with the first WAP and the second WAP during the multiplexing.

7. The mobile device of claim 2, further comprising an application to communicate to one or more target devices.

8. One or more non-transitory computer-readable media having computer-useable instructions embodied thereon, that when executed by a computing device, perform a method of maintaining a communication session of a mobile device during handoff, the method comprising:
tunneling an inner IP address through a first outer IP address to form a first encrypted communication tunnel, wherein the first outer IP address is received from a first wireless access point (WAP); and
tunneling the inner IP address through a second outer IP address to form a second encrypted communication tunnel, wherein connectivity of the communication session is maintained via the inner IP address, wherein the second outer IP address is received from a second WAP; and
disassociating the first encrypted communication tunnel after data communication over the second encrypted communication tunnel has been established, wherein connectivity is maintained by simultaneously multiplexing data communication between a first software module associated with the first outer IP address and a second software module associated with the second outer IP address until the handoff of the mobile device from the first WAP to the second WAP is completed.

9. The one or more non-transitory media of claim 8, wherein the inner IP address is not associated with either the first WAP or the second WAP.

10. The one or more non-transitory computer-readable media of claim 8, wherein the each of the first encrypted tunnels and second encrypted tunnels is utilized to connect with a routing device.

11. The one or more non-transitory computer-readable media of claim 8, wherein the simultaneously multiplexing occurs via a network interface card.

12. The one or more non-transitory computer-readable media of claim 8, wherein the simultaneous multiplexing is disabled when a data packet of the communication session is received through the second encrypted tunnel.

13. A mobile communication system for maintaining communication connectivity during a handoff between wireless access points, the mobile communication system comprising:
a mobile device comprising a network interface card;
a plurality of wireless access points (WAPs) for transmitting and receiving signals from the mobile device;
a router for assigning to the mobile device an inner internet protocol (IP) address that is tunneled inside of a first outer IP address received from a first WAP to form a first encrypted communication tunnel and tunneled inside of a second outer IP address received from a second WAP to form a second encrypted communication tunnel; and a communication session network between the mobile device, the first WAP, the second WAP, and the router that maintains connectivity of the mobile device with the first encrypted communication tunnel and the second encrypted communication tunnel during a handoff of the mobile device from the first WAP to the second WAP, wherein connectivity is maintained by simultaneously multiplexing data communication between a first software module associated with the first outer IP address and a second software module associated with the second outer IP address until the handoff of the mobile device from the first WAP to the second WAP is completed.

14. The mobile communication system of claim 13, wherein the network interface card comprises a plurality of software modules.

15. The mobile communication system of claim 14, wherein each of the WAPs are associated with a respective software module of the plurality of software modules.

16. The mobile communication system of claim 14, further comprising a multiplexor to maintain communication back and forth between the first encrypted communication tunnel and the second encrypted communication tunnel until completion of the handoff.

17. The mobile communication system of claim 16, wherein the multiplexing is disabled when a data packet of the communication session is received through the second encrypted tunnel.

* * * * *